(12) United States Patent
Lee et al.

(10) Patent No.: US 6,473,208 B1
(45) Date of Patent: Oct. 29, 2002

(54) TWO-COLOR HOLOGRAPHIC RECORDING APPARATUS

(75) Inventors: Myeongkyu Lee, Tsukuba (JP); Kenji Kitamura, Tsukuba (JP); Yasunori Furukawa, Tsukuba (JP); Shunji Takekawa, Tsukuba (JP); Yoshihisa Ito, Tsurugashima (JP); Hideki Hatano, Tsurugashima (JP); Satoru Tanaka, Tsurugashima (JP)

(73) Assignees: Director General of National Institute for Research in Inorganic Materials, Science and Technology Agent, Ibaraki (JP); Pioneer Corporation, Tokyo (JP)

( * ) Notice: Subject to any disclaimer, the term of this patent is extended or adjusted under 35 U.S.C. 154(b) by 26 days.

(21) Appl. No.: 09/598,382

(22) Filed: Jun. 21, 2000

(30) Foreign Application Priority Data

Jun. 24, 1999 (JP) .......................... 11-178666

(51) Int. Cl.$^7$ ................................. G03H 1/03
(52) U.S. Cl. ................. 359/1; 359/3; 359/4; 359/6; 359/7; 359/9; 359/11; 359/22; 369/44.23; 369/103; 369/112.04
(58) Field of Search .................. 359/1, 3, 4, 6, 359/7, 9, 11, 22; 369/44.23, 103, 112.04

(56) References Cited

U.S. PATENT DOCUMENTS 5,132,811 A * 7/1992 Iwaki et al. ............... 359/6

OTHER PUBLICATIONS von der Linde, D. et al., "Multiphoton Photorefractive Processes for Optical Storage in LiNbO$_3$", Applied Physics Letters, vol. 25, No. 3, pp., 155–157, (1974).
Guenther, G.W. et al., "Intensity Dependence and White-Light Gating of Two–Color Photorefractive Gratings in LiNbO$_3$", Optical Society of America, Optics Letters. vol. 22, No. 17, pp., 1305–1307, (1997).
Guenther, H. et al., "Two–Color Holography in Reduced Near–Stoichiometric Lithium Niobate", Applied Optics, vol. 37, No. 32, pp. 7611–7623, (1998).

* cited by examiner

Primary Examiner—Audrey Chang
Assistant Examiner—Craig Curtis
(74) Attorney, Agent, or Firm—Finnegan, Henderson, Farabow, Garrett & Dunner, L.L.P.

(57) ABSTRACT

A two-color holographic recording apparatus reduces error signals possibly included in reproduced digital data signals. The two-color holographic recording apparatus has first, second and third light shutters for passing or blocking gate light, signal light and reference light incident on a recording medium respectively, and a controller for controlling the respective states of the first, second and third light shutters.

14 Claims, 3 Drawing Sheets

TWO-COLOR HOLOGRAPHIC RECORDING APPARATUS

BACKGROUND OF THE INVENTION

1. Field of the Invention

The present invention relates to a two-color holographic recording apparatus.

2. Description of the Related Art

A holographic memory system is known as a digital information recording system which applies the principles of holography. The information recording system is characterized by recording information signals recorded on a recording medium as optical signals. For the recording medium, photorefractive crystals such as lithium niobate (hereinafter abbreviated as "LN") single crystals are used.

FIG. 1 shows a conventional holographic recording apparatus. Laser light 12 emitted from a laser light source 11 is split into signal light 12a and reference light 12b in a beam splitter 13. The signal light 12a is expanded in its diameter by a beam expander 14, and then irradiated to a dot matrix panel 15 as collimated light. The dot matrix panel 15 receives recording data, converted by an encoder, as electric signals, and forms a light and dark dot pattern on a plane. The signal light 12a including data signal components is optically converted as it transmits the dot matrix panel 15. The signal light 12a including dot pattern signal components passes through a Fourier lens 16 which Fourier transforms dot pattern signal components of the signal light 12a which is then converged into a recording medium 10. On the other hand, the reference light 12b split in the beam splitter 13 is guided to the recording medium 10 by mirrors 17, 18, and intersects an optical path of the signal light 12a within the recording medium 10 to form a light interference pattern. The recording medium 10 made of photorefractive crystal records the spatial intensity modulation represented by the light intensity of the light interference pattern as changes in refractive index. In the foregoing manner, the information is recorded.

During reproduction, on the other hand, the dot matrix panel 15, for example, blocks the optical path of the signal light 12a so that the recording medium 10 is irradiated only with the reference light 12b. Diffraction light, which reproduces the recorded Fourier-transformed signal light pattern, appears on the opposite side of the recording medium 10 irradiated with the reference light 12b. This Fourier-transformed signal light pattern is guided to an inverse Fourier lens 19 to inverse Fourier transform the signal light pattern to produce a dot pattern signal. The dot pattern signal is received by a light receiving element such as a CCD 20 which again transduces the dot pattern signal to an electrical digital data signal which is then sent to a decoder for reproducing the original data.

In the recording system as described above, since the recording medium is irradiated with the same reference light during reproduction as well as during recording, the recorded signal is erased simultaneously with its reproduction (reproduction induced deterioration).

A two-color holographic recording system is a system which prevents the reproduction induced deterioration. Specifically, this system is provided with a gate light source in combination with a light source in a conventional holographic recording system, and allows signals to be recorded only in a portion of a recording medium which is optically stimulated to a metastable state by gate light emitted from the gate light source. When signals are reproduced, the gate light is blocked so that the recording medium is irradiated only with reference light to read out the signals, so that the recording medium is not stimulated to the metastable state, thereby preventing the reproduction induced deterioration. The two-color holographic recording is described, for example, in D. von der Linde et al., "Multiphoton photorefractive process for optical storage in LiNbO3", Appl. Phys. Lett., Vol. 25, pp 155–157 (1974). Recording media suitable for use in the two-color holographic recording are photorefractive crystals which may form bipolarons. For example, H. Guenther et al., "Intensity dependence and white-light gating of two-color photorefractive gratings in LiNbO3", Opt. Lett. Vol. 22, pp. 1305–1307 (1997) describes LiNbO3 doped with Pr (praseodymium), while H. Guenther et al, "Two-color holography in reduced near-stoichiometric lithium niobate", Appl. Opt. Vol. 37, pp. 7611–7623 (1998) describes crystals which are produced by reducing LN crystals having a near-stoichiometric composition (which do not include impurities or slightly includes Fe).

OBJECT AND SUMMARY OF THE INVENTION

In the two-color holographic recording system, even after information has been recorded, charge carriers optically stimulated to the metastable state within photorefractive crystals serving as a recording medium do not instantaneously return to the base state (or stable state) but gradually return to the base state. Such charge carriers at the metastable state are drifted and rearranged by a spatial electric field including information signals, and spontaneously form a spatial electric field which cancels the former spatial electric field. The formation of the mutually canceling spatial electric fields results in a relatively reduced difference in changes of refractive index in a light interference pattern which has been recorded as the difference in changes of refractive index. In this case, a diffracted signal light pattern reproduced from the recording medium exhibits reduced contrast, and therefore digital data signals eventually reproduced as electronic signals may include a number of error signals.

It is therefore an object of the present invention to provide a two-color holographic recording apparatus which is capable of reducing error signals possibly including in reproduced digital data signals.

The two-color holographic recording apparatus according to the present invention is adapted to impinge interferable signal light and reference light to a recording medium, which has been irradiated with gate light to be optically stimulated to a metastable state, to record information signals carried by the signal light. The apparatus comprises first, second and third light shutters for passing and blocking the gate light, the signal light and the reference light incident on the recording medium; and control means for controlling the respective states of the first, second and third light shutters.

Since the two-color holographic recording apparatus has the means for blocking the gate light in consideration of a time required for charge carriers within photorefractive crystals, which serves as a recording medium, to return from the metastable state to the base state, there are no charged carriers existing at the metastable state after information has been recorded. It is therefore possible to record a light interference pattern on the recording medium as a relatively large difference in changes of refractive index corresponding to the spatial intensity modulation of the light interference pattern including the information signals.

DETAILED DESCRIPTION OF THE EMBODIMENT

Next, an embodiment of the present invention will be described with the accompanying drawings.

Figure 1:
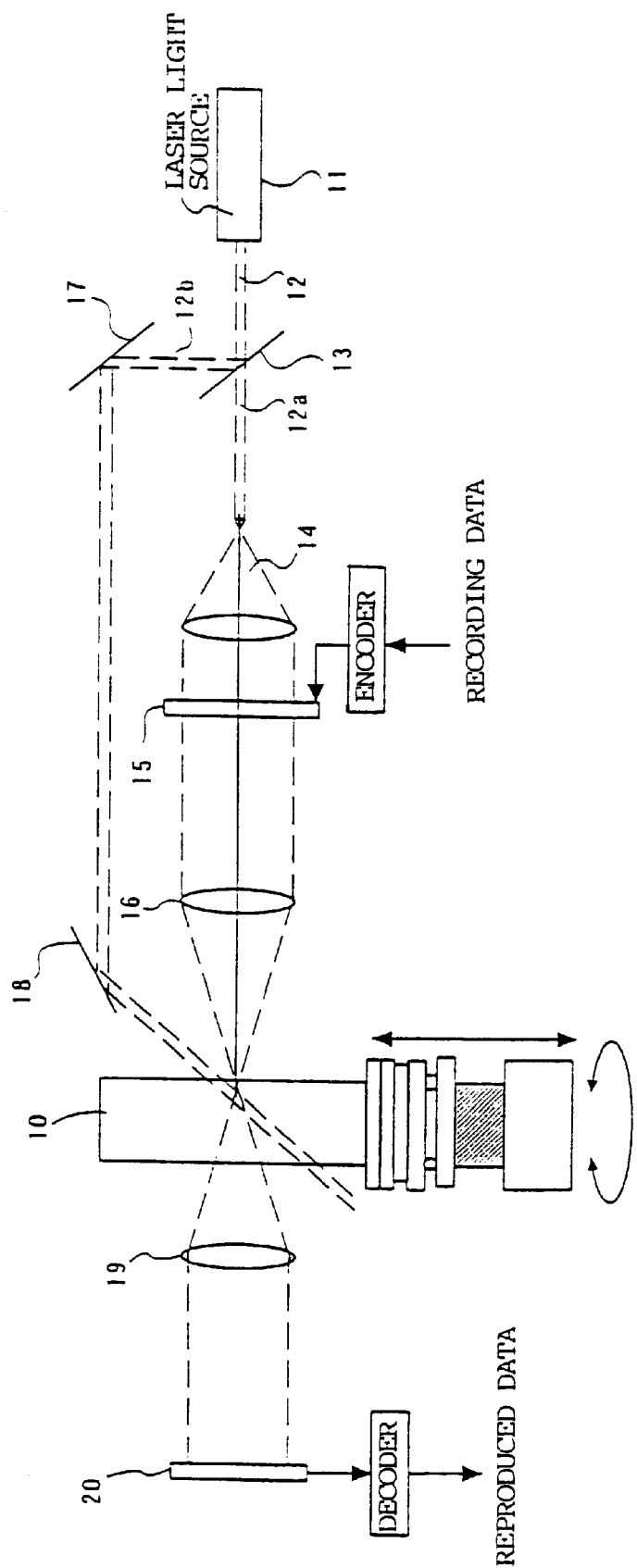
FIG. 1 is a schematic diagram illustrating a conventional holographic recording system.
Figure 2:
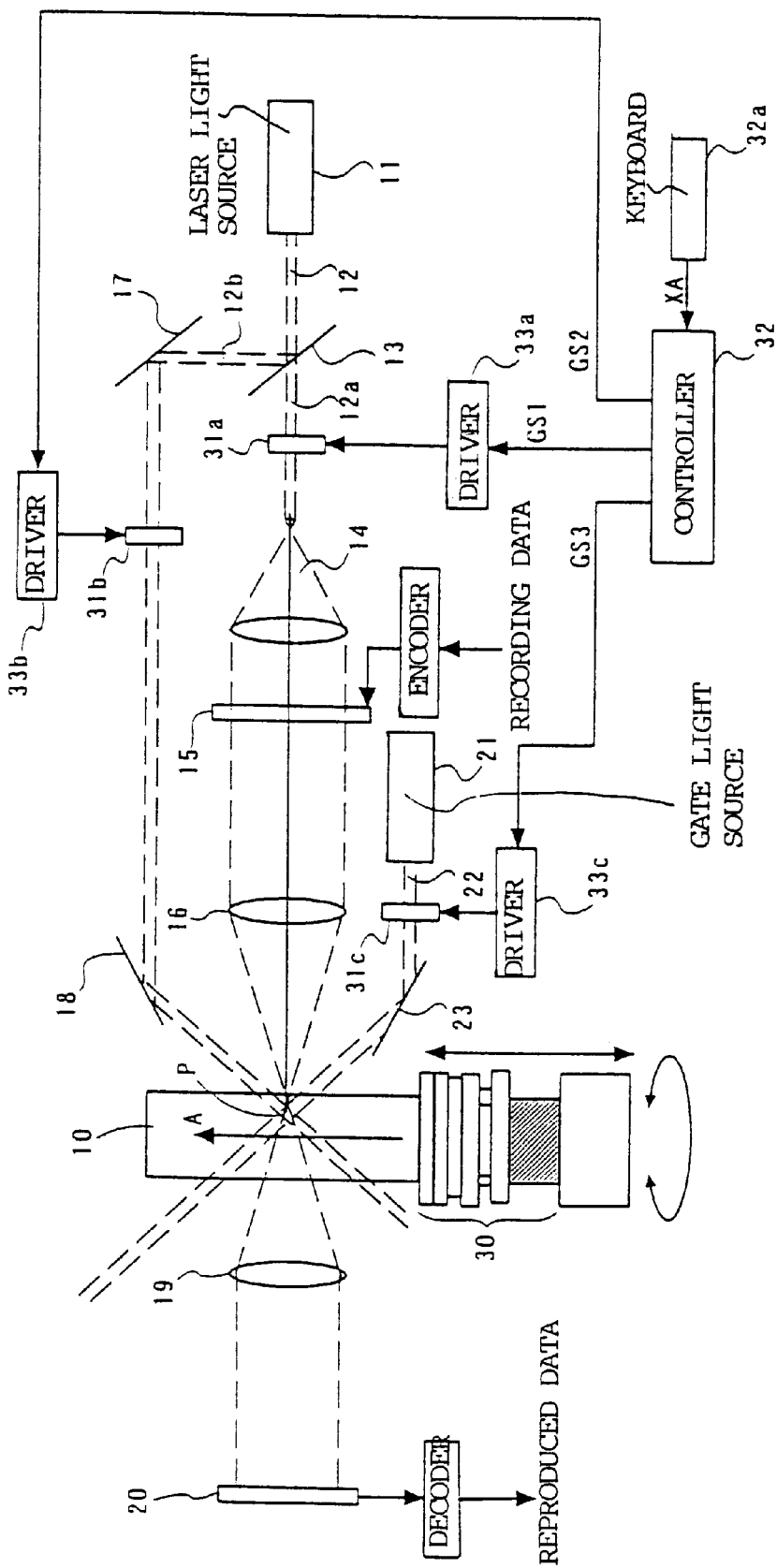
FIG. 2 is a schematic diagram illustrating a holographic recording system according to the present invention.

As illustrated in FIG. 2, in an apparatus according to the present invention, a recording medium 10 may be chosen from a variety of photorefractive crystals which may be used for two-color holographic recording. The photorefractive crystals are produced, for example, by thermally treating LN single crystals in a reduction atmosphere. The recording medium 10 is removably placed on a movable stage 30.

A first light source 11 is an infrared laser diode. Laser light 12 emitted from the laser light source 11 is split into signal light 12a and reference light 12b by a beam splitter 13. The signal light 12a and reference light 12b, which follow different optical paths, are irradiated to the same position P within the recording medium 10.

A shutter 31a, a beam expander 14, an LCD 15 and a 4f-Fourier lens 16 are arranged on the optical path of the signal light 12a. The shutter 31a is provided to open and close the optical path of the signal light 12a. The shutter 31a is driven to open and close through a driver 33a by a signal GS1 sent from a controller 32. The beam expander 14 expands the beam diameter of the signal light 12a, after passing through the shutter 31a, to produce a collimated light beam which is irradiated to the LCD 15. The LCD 15 is a spatial optical modulator such as a liquid crystal panel which receives an electric data signal of a unit page series corresponding to a two-dimensional plane page received from an encoder, and displays a light and dark dot matrix signal. The signal light 12a, when passing through the LCD 15, is optically modulated to include data as dot matrix components. The signal light 12a further passes through the 4f-Fourier lens 16 which Fourier transforms the dot matrix components, and is converged to focus slightly in front of (near the laser light source 11) or behind the position P within the recording medium 10.

The reference light 12b divided from the signal light 12a by the beam splitter 13 is guided to the position P within the recording medium 10 by mirrors 17 and 18. A shutter 31b is interposed between the mirrors 17 and 18 and can open and close the optical path of the reference light 12b. The shutter 31b is driven to open and close through a driver 33b by a signal GS2 sent from the controller 32.

A gate light source 21 is a second light source which can converge the diameter of a beam emitted thereby to irradiate the position P of the recording medium 10 with spot-shaped light, and which has power sufficient to optically stimulate the recording medium 10. The gate light source 21 may be provided, for example, by an ultraviolet laser light source. Gate light 22 emitted from the gate light source 21 passes through a shutter 31c and is reflected by a mirror 23 and is irradiated to a region including the position P within the recording medium 10. The shutter 31c is provided to open and close the optical path of the gate light 22. The shutter 31 is driven to open and close through a driver 33c by a signal GS3 sent from the controller 32.

An inverse Fourier lens 19 and a CCD 20 serving as a light receiving element are disposed on the opposite side of the recording medium 10 to that on which the light from the laser light source 11 is incident, symmetrical to the recording medium 10. The inverse Fourier lens 19 is disposed at a position such that the signal light 12a, which focuses near the position P within the recording medium 10, crosses over and reaches the inverse Fourier lens 19, can be delivered to the CCD 20 as a collimated light beam.

As mentioned above, a variety of photorefractive crystals may be used for the recording medium 10. Information recording characteristics of the laser light source 11 and the gate light source 12 have been previously measured and stocked in ROM (not shown) within the controller 32 as information together with corresponding numbers XA, as will be later described. The measured recording characteristics of the recording medium 10 include (1) a time T1 required for carriers within the photorefractive crystals to be optically stimulated from the base state to the metastable state by the gate light 22 to enable information to be recorded; (2) a time T2 required to record information; and (3) a time T3 required for the carriers in the crystals which had been stimulated to the metastable state to gradually return to the base state to disable information to be recorded after the gate light 22 was blocked. For example, the time T3 may be defined using a lifetime t of the carriers at the metastable state. The lifetime τ may be defined by the following equation as a time constant for the carrier at the metastable state to transition to the base state or to the stable state:

$$n(t) = n_0 \exp(-\tau/t)$$

where n(t) is a carrier density at the metastable state; $n_0$ is a carrier density immediately before the gate light is blocked; and t is the time. In other words, the lifetime τ of the carriers refers to the time required to reduce the number of carriers at the metastable state to 1/e after the gate light is blocked. T3 is preferably selected between τ/100 and 10 τ.

The controller 32 is connected to a keyboard 32a. The keyboard 32a is provided for the user to enter the type of photorefractive crystal selected as the recording medium 10. It should be noted that a tag corresponding to the type of a particular photorefractive crystal may be previously attached to the recording medium 10, and the keyboard 32a may be replaced with a means provided for automatically reading the tag as the recording medium 10 is mounted on the movable stage 30.

The controller 32 also contains a CPU, a RAM and a timer, not shown, and timely issues particular instructions based on a contained program to intensively control opening and closing of the shutters, and so on.

Next, the apparatus according to the present invention configured as the foregoing will be described in terms of operations involved in information recording.

The recording medium 10 is placed on the movable stage 30, and is aligned in consideration of a position at which information is recorded. Then, the laser light source 11 and the gate light source 21 are powered on, however, since the shutters 31a, 31b and 31c are all closed, no light reaches the recording medium 10. As recording data is sent to the LCD 15 through an encoder, the LCD 15 forms a light and dark dot pattern signal on the plane . In this state, the controller 32 proceeds to a shutter open/close subroutine, later described, to expose the recording medium 10 to a light inference pattern including information signals. As the controller 32 returns from the subroutine, the first exposure is terminated. For recording information a second time onward, the respective steps are repeated from the alignment of the recording medium 10. Finally, the LCD 15, the laser light source 11 and the gate light source 21 are all powered off, thus completing all operations.

Next, operations involved in reproduction of information will be described. The recording medium 10 is placed on the movable stage 30, and is aligned such that the reference light 12b is irradiated to a portion at which desired information to be reproduced has been recorded. The laser light source 11 is powered on. At this time, since the shutters 31a, 31b and 31c are closed, no light reaches the recording medium 10. The controller 32 transmits the signal GS2 to the driver 31b, causing only the shutter 31b to open. Thus, the recording medium 10 is irradiated only with the reference light 12b. On the opposite side to that of the recording medium 10 irradiated with the reference light 12b, interference pattern light including a light interference pattern is retrieved. The interference pattern light is inverse Fourier transformed by the inverse Fourier lens 19 to reproduce a dot pattern signal, and also transformed into collimated light which is received by the CCD 20. The data signal again transduced to an electrical digital data signal by the CCD 20 is sent to a decoder for reproducing original data. As the shutter 31b is closed, the first information reproduction is terminated. For subsequently reproducing information at a second time onward, the respective steps are repeated from the alignment of the recording medium 10. Finally, as the laser light source 11 is powered off, all operations are completed.

Figure 3:
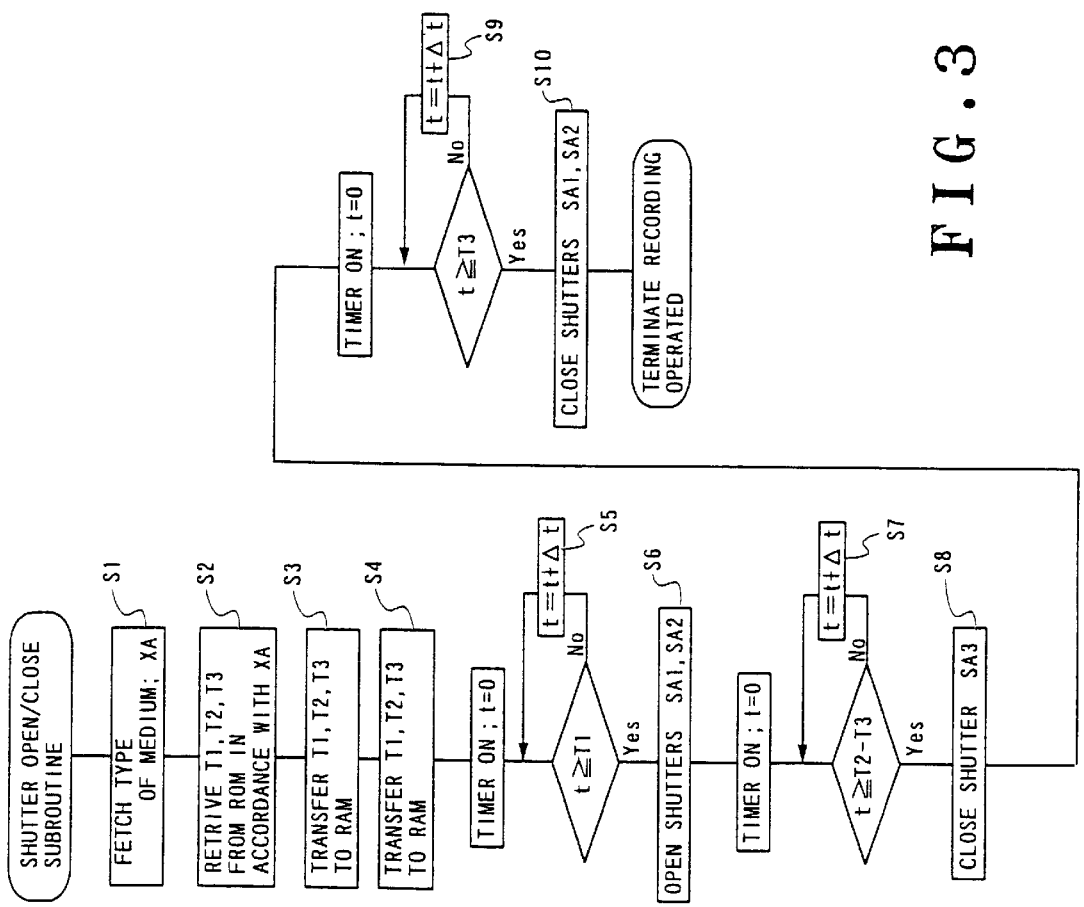
FIG. 3 is a flow chart illustrating a shutter open/close routine during an information recording operation in the holographic recording apparatus according to the present invention.

Next, the shutter open/close subroutine during recording of information in the apparatus of the present invention will be described with reference to a flow chart of FIG. 3. It should be noted that in FIG. 3, the shutters 31a, 31b and 31c are denoted SA1, SA2 and SA3, respectively.

The user enters the type of a photorefractive crystal selected as the recording medium 10 from the keyboard 32a. From the keyboard 32a, a number XA corresponding to the type of the crystal is transmitted to the controller 32 comprising a CPU and so on (step S1). Upon receipt of the number XA, the controller 32 retrieves recording characteristic data of the recording medium corresponding to the number XA as the values of T1, T2, T3 from the ROM (step S2), and transfers the retrieved data to built-in RAM (step S3).

Subsequently, as the controller 32 transmits the signal GS3 to the driver 33c, the shutter 31c is opened to irradiate the gate light 22 to a neighborhood including the position P within the recording medium 10 (step S4).

The timer built into the controller 32 is started. The built-in timer counts the time for a predetermined time period (step S5), and meanwhile, the controller 32 is in a waiting state. Even while the controller 32 is waiting, the gate light 22 is being irradiated to the neighborhood including the position P of the recording medium 10, so that carriers are optically stimulated in such a region gradually from the base state to the metastable state.

As the time T1 has elapsed, the built-in timer stops counting the time, and the controller 32 again starts operating. At this time, carriers at the base state, existing in the region irradiated with the gate light 22 have been optically stimulated to the metastable state to such a degree that information can be recorded. The controller 32 transmits the signals GS1 and GS2 to the drivers 33a and 33b, respectively, to open the shutters 31a and 31b (step S6). In this way, exposure of a light interference pattern is started.

As the built-in timer again starts counting the time, the controller 32 is set into a waiting state (step S7), while the exposure of the light interference pattern still continues.

As a time (T2–T3) has elapsed, the built-in timer stops, causing the controller 32 to start operating. The controller 32 transmits the signal GS3 to the driver 33c to close the shutter 31c to block the gate light irradiated to the recording medium 10 (step S8).

The built-in timer again starts counting the time, and the controller 32 is set into a waiting state (step S9). Meanwhile, charged carriers optically stimulated to the metastable state gradually return to the base state, whereas the exposure of the light interference pattern still continues.

As the time T3 has elapsed, the built-in timer stops operating, causing the controller 32 to start operating. The controller 32 transmits the signals GS1 and GS2 to the drivers 33a and 33b, respectively, to close the shutters 31a and 31b (step S10).

Thus, the exposure of the light interference pattern is terminated. At this time, the charged carrier optically stimulated to the metastable state do not have energy enough to form at least a spatial electric field which cancels the spatial electric field previously formed with the information signal included therein.

When the foregoing operations are completed, the flow returns to the main routine.

As described above, since the two-color holographic recording apparatus according to the present invention can record more clearly the spatial intensity modulation of a light interference pattern including information signals, error signals possibly included in reproduced digital data signal can be reduced. It should be noted that the foregoing effects can be produced even if T1 is zero or negative.

What is claimed is:

1. A two-color holographic recording apparatus for impinging interferable signal light and reference light onto a recording medium, which has been irradiated with gate light to be optically stimulated to a metastable state, to record information signals carried by the signal light, said apparatus comprising:

first, second, and third light shutters for passing and blocking said signal light, reference light, and gate light, respectively when open and closed, respectively; and control means for controlling respective states of said first, second, and third light shutters.

2. A two-color holographic recording apparatus according to claim 1, wherein said control means includes:

pausing means for closing all of said first, second, and third light shutters;

light exciting means for opening said third light shutter to irradiate said gate light onto at least a portion of said recording medium;

recording means for opening said first and second light shutters to record information on said portion of said recording medium;

light excitation stopping means for closing said third light shutter to block the gate light irradiated onto said recording medium; and recording stopping means for closing said first and second light shutters to terminate the recording of information on said recording medium, wherein said light excitation stopping means is actuated a time T earlier than said recording stopping means is actuated, where T is larger than zero.

3. A two-color holographic recording apparatus according to claim 2, wherein said time T is in a range of $\tau/100 < T < 10\tau$, where τ is a lifetime of carriers at the metastable state of a material composing said recording medium.

4. A holographic recording apparatus, comprising:

a recording medium;

a first light source producing a signal light irradiated along a signal light optical path onto a first position on the recording medium and a reference light irradiated along a reference light optical path onto the first position on the recording medium to record a signal carried by the signal light;

a second light source producing a gate light irradiated along a gate light optical path onto a region of the recording medium including the first position to optically stimulate the recording medium from a base state to a metastable state to allow recording of signals;

a first shutter selectively opening and closing to unblock and block, respectively, the signal light optical path;

a second shutter selectively opening and closing to unblock and block, respectively, the reference light optical path; and a third shutter selectively opening and closing to unblock and block, respectively, the gate light optical path.

5. The holographic recording apparatus of claim 4, wherein the recording medium is removably disposed on a movable stage.

6. The holographic recording apparatus of claim 4, wherein the recording medium comprises photorefractive crystals comprising charge carriers that are optically stimulated by the gate light.

7. The holographic recording apparatus of claim 4, further comprising:

a plurality of drivers, wherein each driver actuates a respective shutter; and a controller for sending an actuation signal to each driver.

8. The holographic recording apparatus of claim 4, further comprising a light receiving element on a side of the recording medium opposite to the first position for receiving reference light that passes through the recording medium.

9. The holographic recording apparatus of claim 4, wherein light produced by the first light source has a longer wavelength than light produced by the second light source.

10. A method of manipulating information with a holographic recording system comprising a recording medium, a signal light, a reference light, and a gate light, and a first shutter, a second shutter, and a third shutter selectively opening and closing to unblock and block, respectively, an optical path of the signal light, the reference light, and the gate light, respectively, the method comprising:

closing the first shutter, the second shutter, and the third shutter;

activating the signal light, the reference light, and the gate light;

opening the third shutter to allow the gate light to irradiate a region of the recording medium containing a first position to optically stimulate the recording medium from a base state to a metastable state to allow recording of signals;

opening the first shutter and the second shutter to allow the signal light and the reference light to irradiate the first position on the recording medium to record a signal carried by the signal light;

closing the third shutter; and closing the first shutter and the second shutter.

11. The method of claim 10, further comprising:

opening the second shutter to allow the reference light to irradiate the first position on the recording medium; and retrieving a light interference pattern from a side of the recording medium opposite to the first position to reproduce the recorded signal.

12. The method of claim 10, wherein the recording medium comprises photorefractive crystals comprising charge carriers that are optically stimulated by the gate light.

13. The method of claim 12, wherein closing the third shutter is performed at a time T earlier than closing the first shutter and the second shutter, where T is larger than zero.

14. The method of claim 13, wherein the time T is in a range of $\tau/100 < T < 10\tau$, where τ is a lifetime of the charge carriers of the photorefractive crystals at the metastable state.

* * * * *